United States Patent

[11] 3,574,998

[72] Inventors Hans Von Bredow
Worthington;
William W. Vogelhuber, Columbus, Ohio
[21] Appl. No. 821,879
[22] Filed May 5, 1969
[45] Patented Apr. 13, 1971
[73] Assignee Pennwalt Corporation
Philadelphia, Pa.

[54] CRYOGENIC EXPANSION ENGINE
6 Claims, 9 Drawing Figs.
[52] U.S. Cl. .................................................. 60/36,
60/24, 62/38, 62/6, 62/403, 92/109
[51] Int. Cl. ...................................................F01b 31/00,
F01k 25/00, F25d 9/00, F25b 9/00
[50] Field of Search.......................................... 60/24, 36;
62/6, 38, 403; 92/109, 110

[56] References Cited
UNITED STATES PATENTS
2,397,734 4/1946 Goebel et al. ............... 62/6X
2,616,242 11/1952 Horowitz et al. ............ 92/109X
2,915,050 12/1959 Allred ......................... 92/110X
3,091,092 5/1963 Dros ........................... 60/24X Primary Examiner—Martin P. Schwabron
Assistant Examiner—Robert R. Bunevich
Attorneys—Carl A. Hechmer, Jr. and Stanley Bilker ABSTRACT: A cryogenic gas-expansion engine which includes a cold end having a piston reciprocable within a cylinder and valves controlling the admission and exhausting of gas from the cylinder so as to effect isentropic expansion of the gas within the cylinder, and a warm end with means for transforming reciprocating motion into rotary motion. The piston rod and the valve-lifting rods include long tubular intermediate portions to inhibit conduction of heat from the warm-end to the cold-end cylinder. Both the piston rod as well as the valve-lifting rods are all stressed in tension during the actuating portion of their strokes to prevent compressive forces which might buckle the tubular portions. The intake valve constitutes an outward opening spring-closed poppet with its valve head abutting against an exterior seat outside the cylinder. The exhaust valve is an inward opening spring-closed poppet whose head abuts an interior seat within the cylinder. An exhaust rod rocker arm converts the tensioning force which actuates the exhaust valve to a compressive force on the solid shank of the valve stem in order to push open the exhaust valve.

Patented April 13, 1971
3,574,998
5 Sheets-Sheet 1
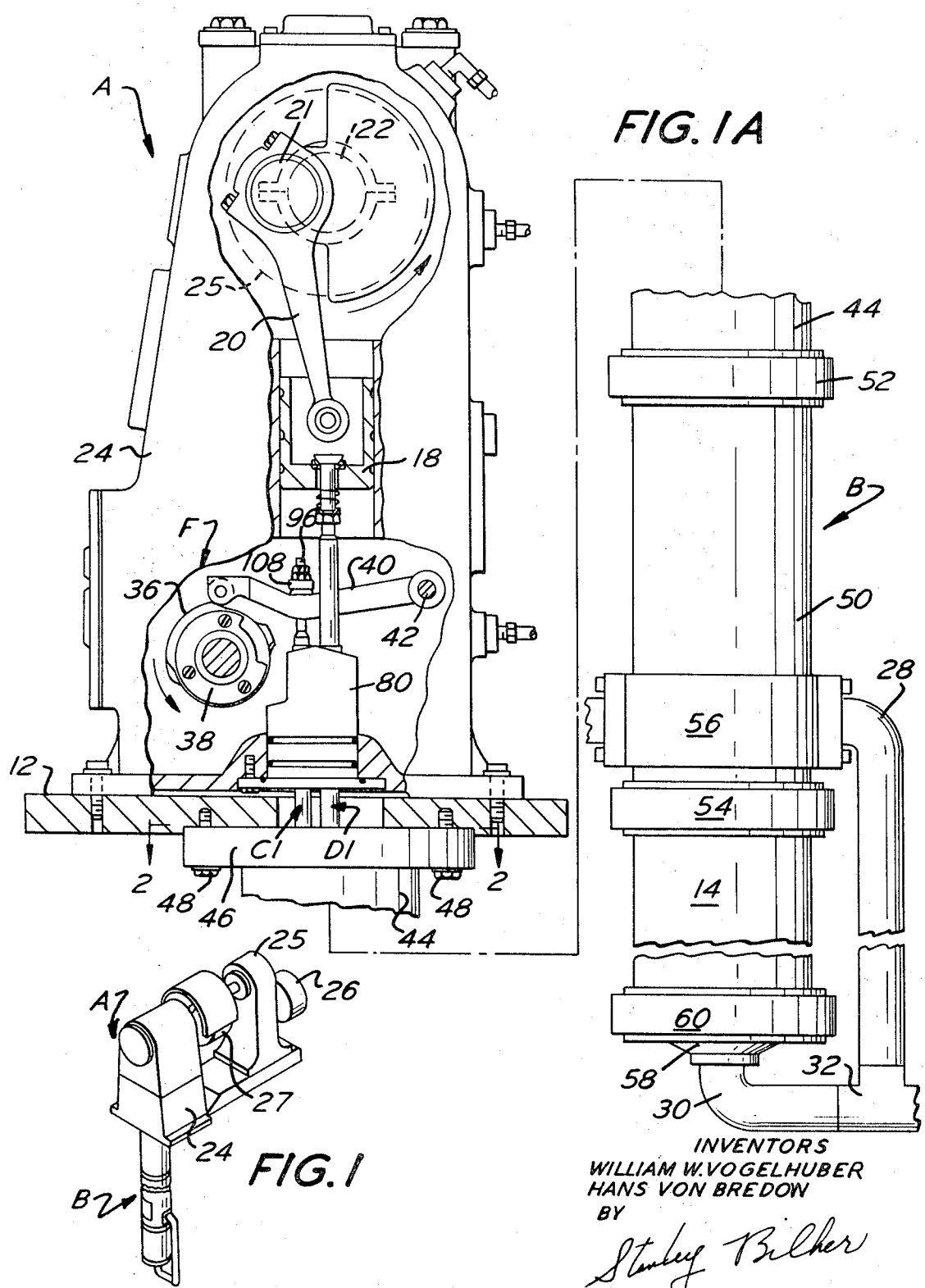
FIG. IA
FIG. I
INVENTORS
WILLIAM W. VOGELHUBER
HANS VON BREDOW
BY
Stanley Bilker
ATTORNEY

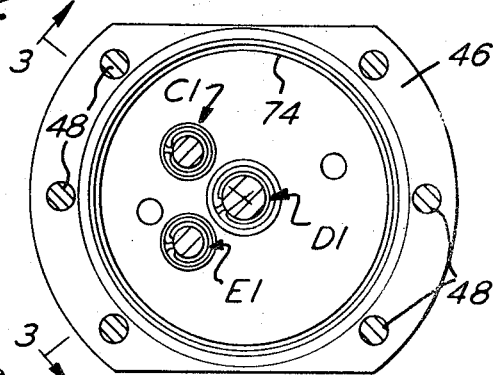
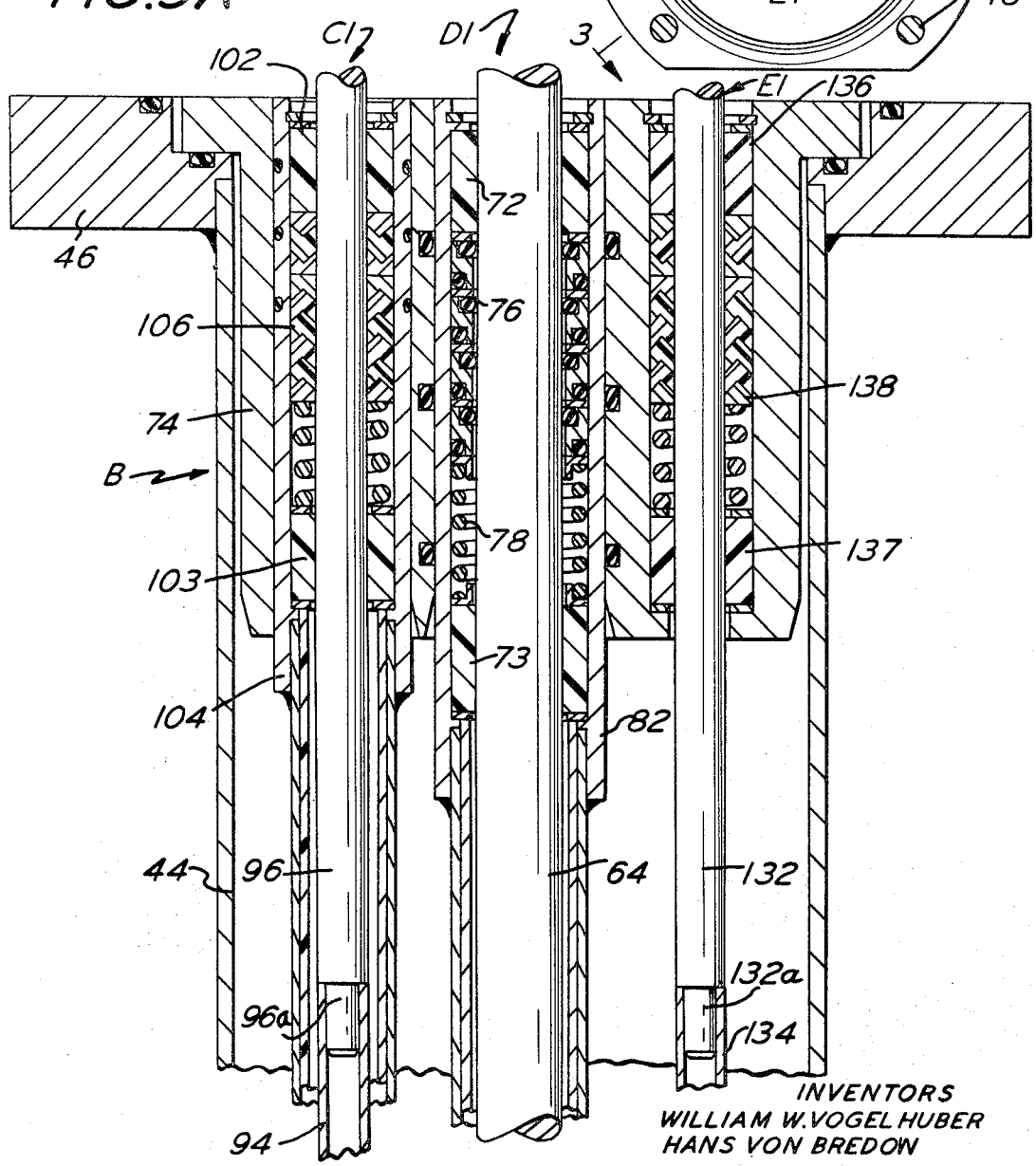

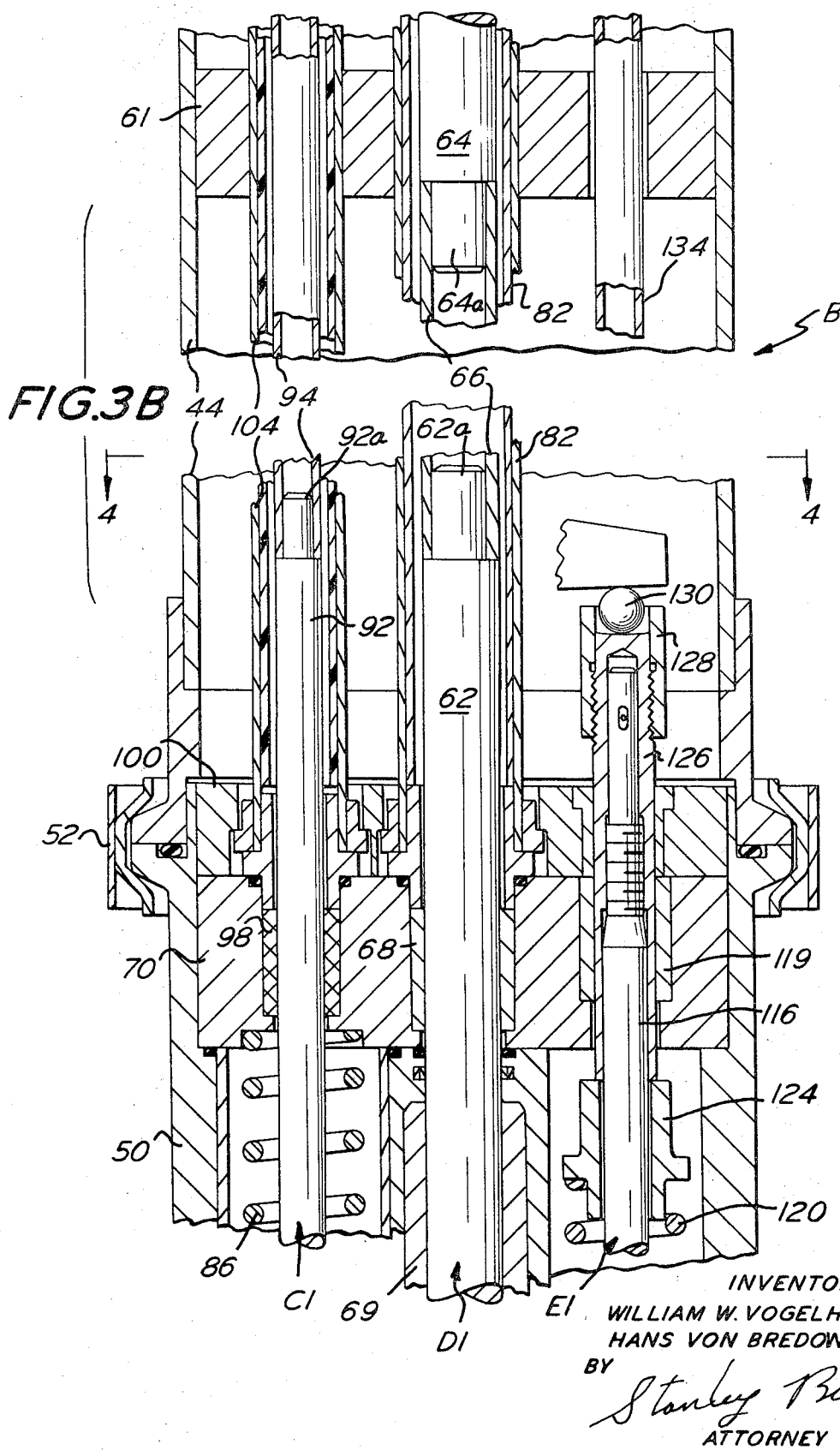

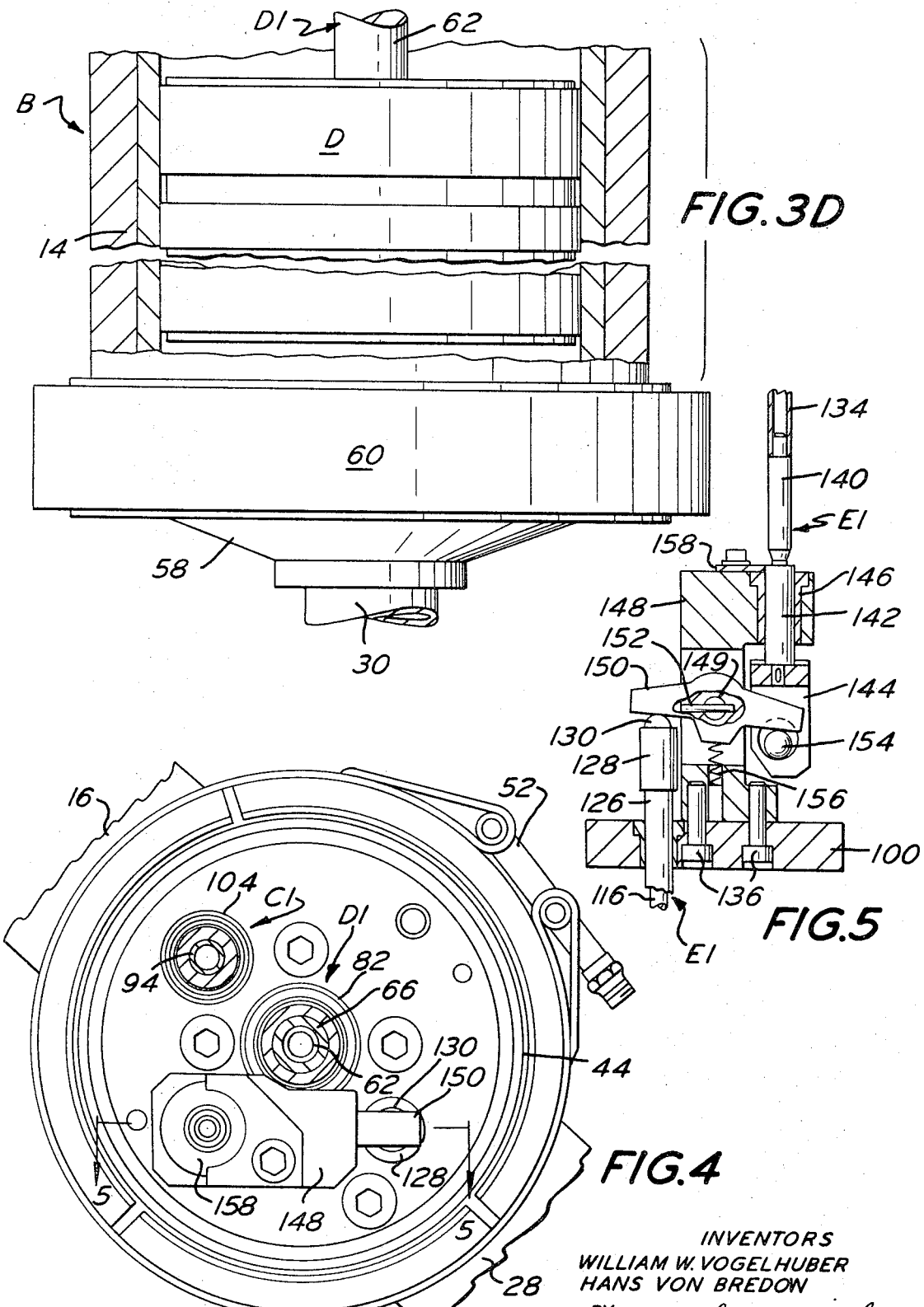

CRYOGENIC EXPANSION ENGINE

This invention relates to cryogenic apparatus and more particularly relates to a reciprocating piston-expansion engine for cooling gases, such as nitrogen, helium and oxygen, to extremely low temperatures by isentropically expanding the gas in the engine cylinder. The invention is concerned with expansion engine improvements which inhibit the conduction of heat from its warm end to its cold end, especially in regard to piston rod and valve lifter construction, and also in improvements of the intake and exhaust valves themselves to insure optimum gas pressure during the power and exhaust strokes.

As is well known, an expansion engine is a device for absorbing energy from a gas during isentropic expansion thereof. The energy which is removed by the performance of external work produces a drop in gas temperature. A predetermined amount of a gas which is contained under pressure within a large vessel, termed a Dewar, is admitted into a cylinder which is closed at one end by a reciprocable piston. The gas is allowed to expand against the piston causing the latter to move longitudinally. The reciprocable longitudinal movement of the piston is transmitted through a piston rod and crosshead which converts the linear motion into rotary motion at a crankshaft. The crankshaft is coupled to an induction motor or generator through a variable speed drive, the mechanical power developed by the piston being dissipated by the generator in the form of electrical power through a load. The load is applied to the expansion engine if it overruns the set speed of the variable speed drive.

A flywheel on the crankshaft causes the rotational movement to proceed onwardly by inertial momentum and drives the expansion piston in turn through the exhaust cycle. Valve lifters actuated by cams in timed relationship with the reciprocating motion of the piston control valves in the cylinder head for admission of gas into the cylinder during the power stroke and discharge the gas during the exhaust stroke. Rods for lifting the intake and exhaust valves are enclosed within and extend through a supporting jacket which is part of the cold end of the expansion engine. The rotary mechanisms are all enclosed within a housing at the warm end.

One of the basic problems occurring in the low temperature expansion of a gas within an expansion engine is the thermal transfer or conduction of heat from the engine's warm end, which is at ambient temperature, to the cold end which is immersed within the Dewar containing the high-pressure cryogenic gas. The heating of the cylinder, of course, transfers heat to the gas which is being cooled by expansion and detracts from the efficiency of the refrigeration cycle. Since the piston and valve rods themselves conduct heat from the warm end of the machine at room temperature to the cold end of the machine at a cryogenic temperature, $-200°$ F. to $-459°$ F., the passage of heat through the rods must be inhibited, especially because of the extremely critical temperatures and in view of the temperature gradient.

It is therefore an object of this invention to provide a reciprocating cryogenic expansion engine in which the valve and piston rods are of a construction that inhibits the transfer of heat from the warm end to the cold end.

Another object of this invention is to provide an expansion engine having thermally insulating valve and piston rods of a new improved construction without sacrificing strength or efficiency of the engine operation.

Yet another object of this invention is to provide a cryogenic expansion engine in which the piston and valve rods are elongated and of minimal cross section in order to offer resistance to the conduction of heat from the warm end to the cold end.

Still another object of this invention is to provide a cryogenic expansion engine in which the piston and valve rods include long tubular intermediate portions to resist transfer of heat from the warm end to the cold end.

However, when long tubular members, such as valve and piston rods are used, it is important to avoid the imposition of stresses which might cause these members to bend, bow or buckle. That is, when compressive forces are exerted on such long tubular members, they act as columns in which actuating pushing forces in a compression direction may cause their collapse.

It is therefore a still further object of this invention to employ tubular piston and valve rods in a reciprocating cryogenic expansion engine in which the stress imposed upon the tubular sections are always in a pulling or tension direction.

Yet a still further object of this invention is to provide a valve mechanism for a cryogenic expansion engine in which the valve-lifting rods pull upon the valve stems to open the valves against the bias holding the valves closed.

Since the intake port of an expansion engine normally communicates with the high-pressure gas within a Dewar, for example, gas which is compressed to 3,000 p.s.i., it is expedient for the Dewar gas pressure to act in support of the bias tending to hold the intake valve closed. Hence, the intake valve opens in an outward direction against an external seat of the expansion cylinder, and the bias of a spring normally pushes the valve head in abutting closed disposition with the external valve seat. The valve lifters would then pull upon the valve rod in a tension direction for opening the valve against the combined spring bias and the pressure of the gas in the Dewar.

However, the exhaust port which discharges the cooled or liquefied gas after isentropic expansion through the load operates under a much lower pressure, said discharge pressure not nearly being of a magnitude comparable to the Dewar pressure. As a consequence, if the exhaust valve seat were on the same external side of the cylinder as the intake valve seat, pressure occurring during the gas inlet part of the cycle or the recompression stroke of the piston might achieve a pressure overcoming the spring bias holding the exhaust valve closed. This latter condition would cause premature opening of the exhaust valve with consequent reduction in efficiency of the refrigeration cycle.

Accordingly, it is still a further object of this invention to utilize an inwardly opening exhaust valve for an expansion engine in which the valve head is normally held closed against an internal seat within the cylinder.

Yet still another object of this invention is to provide a rocker arm for an inwardly opening exhaust valve, in an expansion engine in which the tubular lift rod for the valve will be in tension during valve actuation.

Other objects of this invention are to provide an improved device of the character described which is easily and economically produced, which is sturdy in construction and both highly efficient and effective in operation.

With the above and related objects in view, this invention consists of the details of construction and combination of parts as will be more fully understood from the following detailed description when read in conjunction with the accompanying drawings in which:

FIG. 1 is a front elevational view of a cryogenic expansion engine embodying this invention.

FIG. 1A is an enlarged side elevational view thereof and partly broken away.

FIG. 2 is a sectional view taken along lines 2—2 of FIG. 1.

Figure 3C:
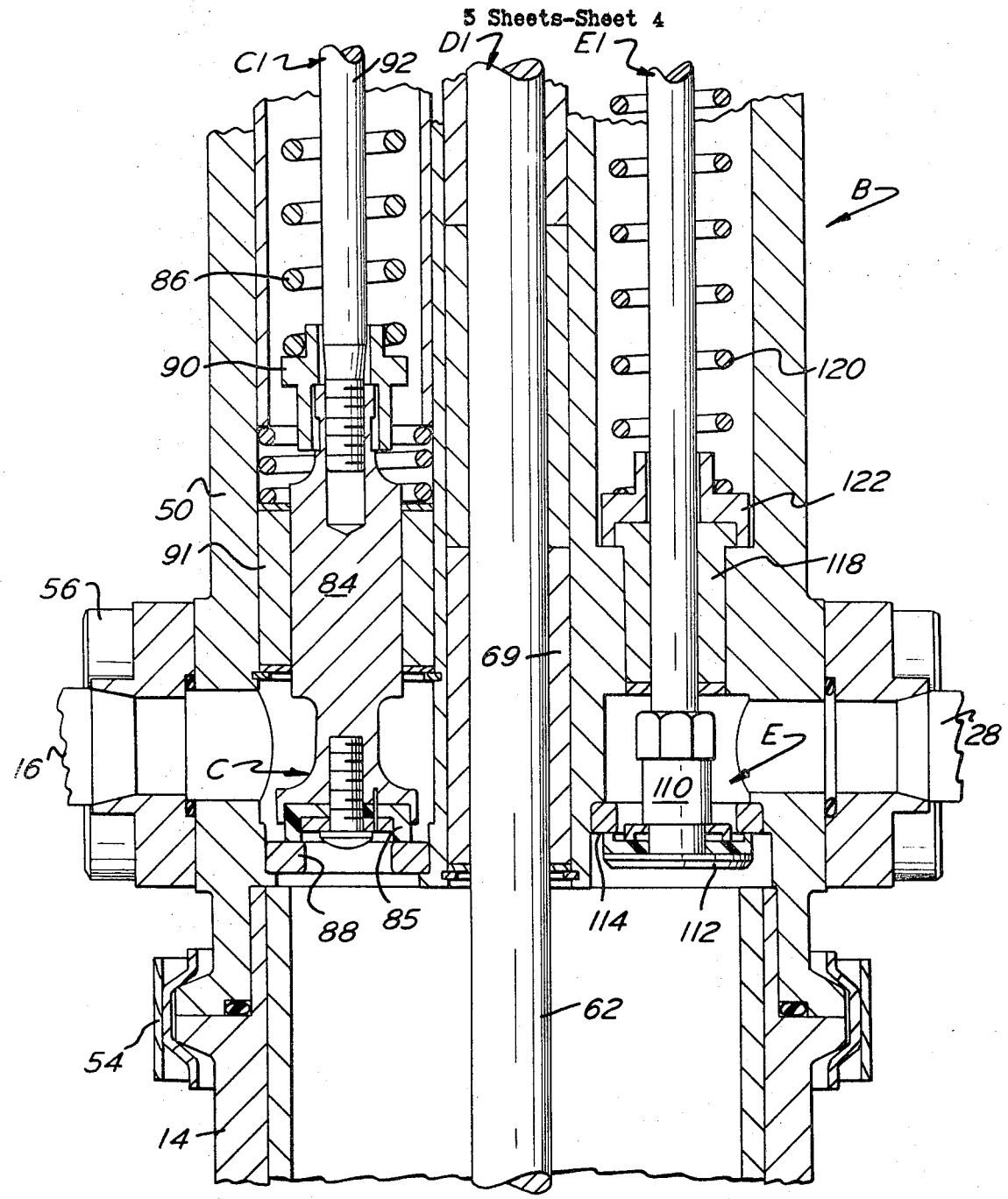

A sectional view taken along lines 3—3 of FIG. 2 includes FIG. 3A which shows the upper portion of the cold end and the piston and valve rods thereof, FIG. 3B which shows the intermediate portion of the cold end, FIG. 3C which shows the valves and the upper portion of the expansion cylinder; and FIG. 3D which shows the lower portion of the expansion cylinder and the piston thereof.

FIG. 4 is a sectional view taken along lines 4—4 of FIG. 3B.

FIG. 5 is a sectional view taken along lines 5—5 of FIG. 4.

Referring now in greater detail to the drawings in which similar reference characters refer to similar parts, we show an expansion engine for absorbing energy and producing a drop in temperature of a cryogenic gas. The expansion engine comprises a warm end, generally designated as A, and a cold end, generally designated as B, these being separated from each other by a mounting plate 12. The mounting plate 12 is usually affixed to the upper portion of the Dewar (not shown) so that the cold end B is entirely enclosed therewithin.

The instant expansion engine B is a one-cylinder, two-cycle system driven by the gas under pressure in the Dewar. For example, helium at 24° K. and 285 p.s.i.g. is admitted into expansion cylinder 14 by way of intake valve C which is located within the inlet port 16 which communicates with the Dewar interior. See FIG. 3C. The gas expands within the cylinder and forces piston D downwardly, as illustrated in FIG. 3D. The downward linear motion of the piston D is converted into rotary motion by transmission through piston rod D1, crosshead 18, connecting rod 20 and the throw 21 of crankshaft 22, the latter three elements being located within the housing 24 of the warm end A, as shown in FIG. 1A. The crankshaft 22 is coupled to a variable speed drive unit 25 which turns an induction motor-generator set 26 which dissipates the energy through the power line. A load is applied to the expansion engine if it should overrun the set speed of the varidrive unit 25. The momentum of a flywheel 27 on crankshaft 22 acts to carry it onward by inertia and drive the expansion piston D upward through the exhaust cycle. Opening of exhaust valve E allows the gas in the cylinder 14 to be discharged and pumped to the load through exhaust manifold 28. Conduit 30 which acts as a pressure equalizer on the bottom of the cylinder is connected to T-fitting 32 in the exhaust manifold.

Actuation of the intake valve C and exhaust valve E is accomplished by a conventional poppet-lifting assembly F located in the warm end. The poppet-lifting assembly F includes a series of cams supported on camshaft 34. The camshaft 34 is coupled to the crankshaft 22 by a suitable chain and sprocket drive or timing gears (not shown). Intake opening and closing cam lobes 36 and 38 are pinned together and operate rocket or lifter arm 40 which is pivotally supported on shaft 42. Lifter arm 40 is coupled to intake valve lifter rod C1 which actuates the opening of the intake valve C. The exhaust-opening and -closing cams (not shown) are similarly arranged on the camshaft for actuating the opening of the exhaust valve E through lifter rod E1 at timed intervals.

The intermediate portion of the piston rod D1 as well as the intermediate sections of the intake and exhaust valve lifters are all tubular in configuration and approximately 5 to 6 feet long in order to inhibit thermal conduction from the warm end A to the cold end B. They are all preferably of stainless steel construction for strength and low-conductivity characteristics. That is, since heat conduction is in general directly proportional to the area of the member and inversely proportional to its length, the various rods are extended in length and reduced in cross section without sacrificing substantial strength. In this manner, substantial resistance to heat transfer from the warm end to the cold end results although subject to a large temperature gradient.

The cold end B includes a cylindrical jacket 44 which acts as a support for the cylinder 14. The jacket 44 is of stainless steel and includes a flange 46 for attaching the cold end B to the mounting plate 12 by means of bolts 48. See FIGS. 1A and 2. The lower periphery of the jacket 44 is coupled to cylinder head 50 by a V-band coupling 52 which draws the complementary abutting beaded rims together. Cylinder 14 is connected to the lower periphery of the head 50 again using V-bands 54 which couple the beaded rims together immediately below valve cover 56. The lower circumference of the cylinder 14 is closed by a bottom cap 58 which is attached to the cylinder by V-band 60. The return conduit 30 communicates with the cylindrical space below piston D and acts as a pressure equalizer for the bottom of the piston. As shown in FIG. 3B a micarta spacer 61 provides lateral support for the jacket 44 and retains the piston rod D1 and the valve rods C1 and E1 in spaced disposition with respect to each other.

The piston rod D1 is comprised of three basic segments, a lower solid shank portion 62 which is suitably connected to the piston D, an upper solid rod portion 64 which is connected to the crosshead 18, and a long tubular intermediate portion 66 which is pressed fit over and permanently connected to stubs 62a and 64a at the ends of the solid rod portions. See FIG. 3B. The upper portion of the shank 62 is slidably supported in bushing 68 which is retained in bearing housing 70. An upper bushing 72 supported in cold-end seal housing 74 axially supports the upper solid rod portion 64 of piston rod assembly D1. A packing seal 76 is held between bushing 72 and its lower counterpart 73 by helical spring 78, as shown in FIG. 3A. A warm-end seal housing 80 includes an internal slide bearing (not shown) for slidably supporting the upper rod end 64 within housing cover 24. Housing sleeve 82 which has an inner plastic liner encapsulates the intermediate portion of piston rod D1 and provides cover and insulation therefor as well as a packing casing.

The intake valve C is of the poppet type and includes valve stem 84 having a head 85 resiliently urged by spring 86 into closed position against external annular seat 88. Thus, the intake valve C is of the outwardly opening type, the spring 88 being compressed between flanged retainer 90 on the valve stem (FIG. 3C) and a recess at the lower portion of bushing housing 70. The valve stem 84 itself is slidably supported in a graphite bushing 91 within the lower portion of the cylinder head 50.

The intake valve lifter C1 includes a solid shank portion 92 which is threaded into the valve stem 84, an intermediate tubular section 94 which is press fit upon the shank neck 92a, and an upper solid shank portion 96 whose neck 96a is press fit within the upper end of tubular section 94. The shank portion 92 is slidably supported by graphite bushing 98 retained by housing 70 within the cylinder head 50. A rocker assembly support plate 100 covers the upper portion of the cylinder head 50. See FIG. 3B. The upper shank portion 96 is slidably received between spaced bushings 102 and 103 in the cold-end seal housing 74. A housing sleeve 104 encases a spring-loaded chevron packing 106 between the bushings, the lower portion of the sleeve 104 being lined with a fluorocarbon and covers the intermediate portion of the intake lifter rod C1. Finally, the upper shank portion 96 is coupled to lifter arm 40 by nuts 108 which are threaded upon the upper end of the shank.

It is to be observed that the intake valve spring 86 biases the valve head 85 into closed position against its seat 88. The high pressure of the gas in the Dewar operates on the exterior of the valve head 85 through intake port 16 so as to reinforce the bias of the spring 86 in holding the intake valve C closed. Since the cam lifters F pull the intake valve stem 84 upwardly through the lifter rod C1, the tubular section 94 has only a tensioning force or stress imposed thereon during its actuation to open the valve. However, in the case of the exhaust valve E, there is minimal manifold exhaust pressure opposing the recompression stroke in the cylinder 14. Accordingly, if the exhaust valve stem were located on the exterior side of the cylinder 14 and opened outwardly from its seat, the discharge stroke of the piston D would tend to open the valve stem prematurely and adversely affect the pressure-temperature cycle characteristics. Therefore, in the present invention, the exhaust valve E is constructed to be inwardly opening and its head is normally urged closed against an internal seat within the cylinder.

Referring to FIG. 3C, the exhaust valve E includes a stem 110 which is secured to the lower end of the valve lifter rod E1. A head 112 on the exhaust valve stem is disposed on the interior side of the cylinder 14 against internal seat 114. A valve push rod 116 is connected to the stem 110 and is slidably supported at its lower portion by bushing 118 held within cylinder head 50. The upper portion of the push rod 116 is axially slidable in bushing 119 mounted in housing 70. See FIG. 3B. Poppet spring 120 is compressed between bushing retainer 122 and spring retainer 124, the latter being affixed to the push rod so that the head 112 is drawn or pulled into closed position against the internal seat 114 in contradistinction to the intake valve's being pushed by the spring bias against the external seat. The upper portion of push rod 116 includes an extension 126 to permit adjustment. A sleeve 128 is threaded on the extension 128 and supports a ball 130 which acts as a bearing abutment for a rocker arm that reverses the applied force on the upper portion of the exhaust valve lifter assembly E1.

Referring now to FIGS. 2 and 3A, the upper and intermediate portion of the exhaust valve lifter assembly E1 includes an upper solid rod portion 132 which is coupled to its lifter arm (not shown) in a manner substantially identical to that of the intake valve lifter. A long tubular member 134 is secured upon neck 132a of the solid shank 132. The shank 132 is slidably supported between spaced bushings 136 and 137 held in the seal housing 74, and a spring-loaded packing 138 acts as a seal therefor. The warm-end seal housing 80 embraces the upper portion of the shank 132.

Referring now to FIG. 3B, and particularly to FIGS. 4 and 5, the lower end of the exhaust valve tubular member 134 is pressed fit over the neck of extension rod 140. The extension rod 140 is then coupled to stub 142 of yoke 144, the stub being slidably supported in graphite bearing 146 which is held in rocker arm post 148. The post 148 is affixed to support plate 100 by screws 136 extending through the post base. Rocker arm pivot pin 149 carries rocker arm 150 which is held thereon by a roll pin 152. Pin 154 which bridges the legs of yoke 144 engages one end of rocker arm 150, the opposite end of the rocker arm being urged against the ball bearing 130 at the upper end of the push rod 116. Antiflutter spring 156 is retained in a well at the base of the post 148 and abuts against the flat of the rocker arm 150. Bushing retainer 158 maintains bushing 146 within the head of the post.

Thus, as is apparent from the foregoing description, the tubular member 134 of the exhaust valve lifter operates in tension to open the exhaust valve E. The pulling of the uppermost portion of the lifter rod E1 in an upward direction causes the yoke 144 to push the left-hand end of rocker arm 150 downwardly. This forces the pusher rod 116 to act compressively in the valve stem 110 and open its head 112 inwardly off the valve seat 114. Therefore, a deliberate pulling force at tubular member 134 is required to push open the exhaust valve E against its spring bias. Because the internal pressure within the cylinder 14 acts to close the exhaust valve E during the recompression stroke, there is no premature discharge which could detract from the efficiency of the expansion and exhaust cycle. At the same time the use of long tubular intermediate portions in the piston and valve lifter rods affords excellent resistance to heat conduction without sacrifice in mechanical efficiency.

We claim:

1. A cryogenic expansion engine including a cold end having a piston reciprocable within a cylinder and valves for controlling the admission and exhausting of gas, and a warm end with means for transforming reciprocatory motion into rotary motion so as to effect isentropic expansion of the gas within the cylinder, a piston rod interconnecting said piston in the cold end with the rotary means in the warm end and including a long tubular intermediate portion which is stressed in tension during the power and exhaust strokes of said piston, and valve-lifting rods extending from the warm end to the respective valves in the cold-end cylinder, each lifting rod including a long tubular intermediate section which is stressed in tension during actuation of the corresponding valve, whereby the conduction of heat from the warm end to the cold end is inhibited while avoiding the imposition of compressive forces upon said piston and lifting rods.

2. The expansion engine of claim 1 wherein the intake valve opens in an outward direction from said cylinder and includes a valve head operable against an external seat on said cylinder, and means normally urging said valve head in abutting closed disposition with said seat.

3. The expansion engine of claim 2 wherein the exhaust valve opens in an inward direction within said cylinder and includes a valve head operable against an internal seat within said cylinder, and means normally drawing said exhaust valve head in abutting closed disposition with said exhaust valve seat.

4. The expansion engine of claim 3 including a push rod upwardly extending from said exhaust valve, and means constituting a rocker converting a pulling force on the upper portion of said exhaust valve lifter into a pushing force on said push rod to actuate the opening of said exhaust valve.

5. The expansion engine of claim 4 wherein the respective means biasing said intake and exhaust valves into closed position constitute springs.

6. The expansion engine of claim 5 wherein an exhaust manifold for delivering the cooled gas to the load includes a return conduit coupled to the opposite end of the cylinder from the expansion end whereby the exhaust pressure is equalized on both sides of the piston during discharge.